United States Patent [19]
Williamson et al.

[11] Patent Number: 5,659,299
[45] Date of Patent: *Aug. 19, 1997

[54] HIGH SPEED INFRARED COMMUNICATIONS SYSTEM USING PULSE SETS

[75] Inventors: Richard A. Williamson, Danville; Jon M. Knight, Pleasanton; Roger W. Biros, San Jose, all of Calif.

[73] Assignee: Servio Logic Corporation, San Francisco, Calif.

[ * ] Notice: The term of this patent shall not extend beyond the expiration date of Pat. No. 5,475,381.

[21] Appl. No.: 399,890

[22] Filed: Mar. 7, 1995

Related U.S. Application Data

[63] Continuation of Ser. No. 827,004, Jan. 28, 1992, Pat. No. 5,475,381.

[51] Int. Cl.[6] .................................................. H04Q 1/39
[52] U.S. Cl. .......................... 340/825.57; 340/825.6; 341/178; 359/142; 359/184; 455/343
[58] Field of Search .................. 340/825.6, 825.54, 340/825.56, 825.57, 825.64; 341/176, 178, 182, 183; 359/142, 143, 152, 154, 158, 135, 184; 455/343; 375/239, 254, 350

[56] References Cited

U.S. PATENT DOCUMENTS

| | | | |
|---|---|---|---|
| 4,523,332 | 6/1985 | Mori | 455/343 |
| 4,628,541 | 12/1986 | Beavers | 455/603 |
| 4,644,563 | 2/1987 | Ohishi et al. | 375/239 X |
| 4,746,919 | 5/1988 | Reitmeier | 340/825.56 |
| 4,825,200 | 4/1989 | Evans et al. | 341/176 |
| 4,833,467 | 5/1989 | Kobayashi et al. | 340/825.64 |
| 4,987,317 | 1/1991 | Pournain et al. | 455/343 |
| 5,060,303 | 10/1991 | Wilmoth | 359/154 |
| 5,075,792 | 12/1991 | Brown et al. | 359/154 |
| 5,081,402 | 1/1992 | Koleda | 318/16 |
| 5,099,471 | 3/1992 | Tsukada et al. | 359/135 |
| 5,128,792 | 7/1992 | Teich et al. | 375/239 X |
| 5,151,698 | 9/1992 | Pohillat | 375/239 X |
| 5,182,543 | 1/1993 | Siegel et al. | 359/152 |
| 5,227,777 | 7/1993 | Sato et al. | 455/343 |
| 5,253,096 | 10/1993 | Freeman et al. | 359/184 |
| 5,331,450 | 7/1994 | Heep et al. | 340/825.53 X |
| 5,387,906 | 2/1995 | Lee | 375/239 X |
| 5,475,381 | 12/1995 | Williamson et al. | 340/825.57 |

FOREIGN PATENT DOCUMENTS

| | | | |
|---|---|---|---|
| 576115 | 5/1959 | Canada | 341/178 |
| 0 592 104 A2 | 4/1994 | European Pat. Off. | 375/254 |

*Primary Examiner*—Michael Horabik
*Assistant Examiner*—William H. Wilson, Jr.
*Attorney, Agent, or Firm*—Fliesler, Dubb, Meyer & Lovejoy

[57] ABSTRACT

An infrared communication system for transmitting a digital bit stream by telemetry in the presence of background radiation wherein each bit in the data stream is represented by a signature set of pulses designating either a binary one or a binary zero. A receiver detecting an infrared signal filters the signal to detect the signature sets of pulses generated by the transmitter. The pulses are transmitted according to a specific communications protocol.

32 Claims, 10 Drawing Sheets

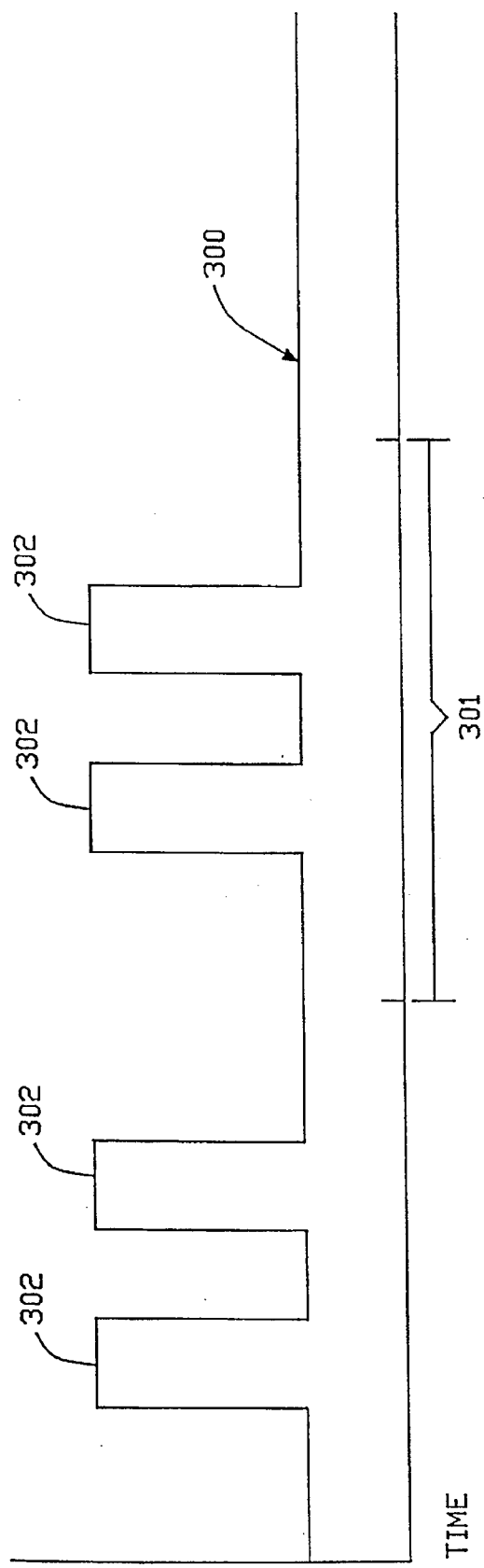
FIG.—8
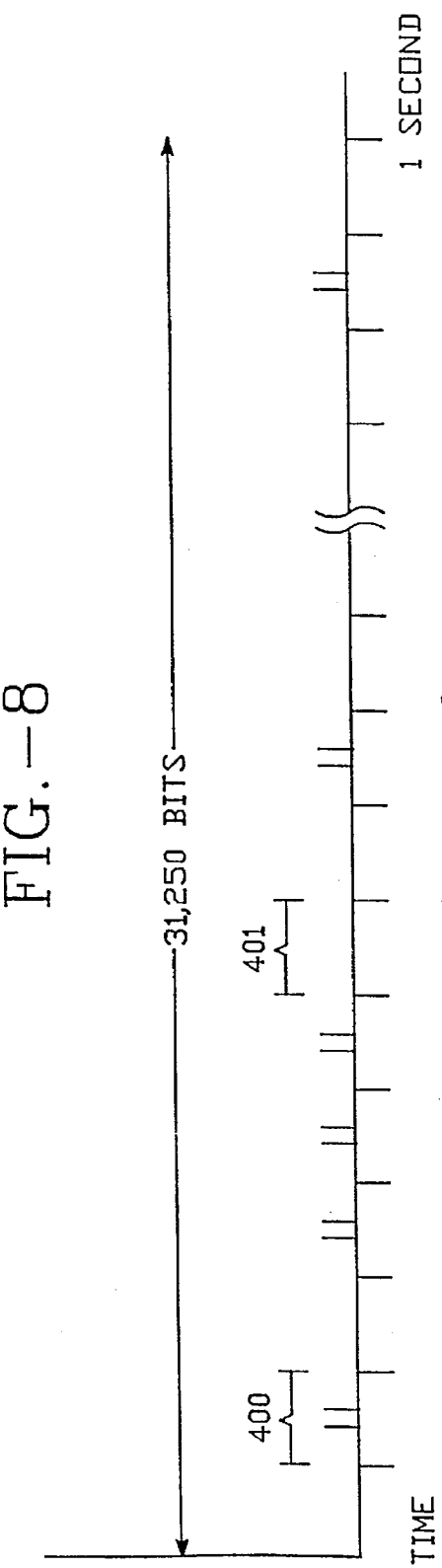
FIG.—9

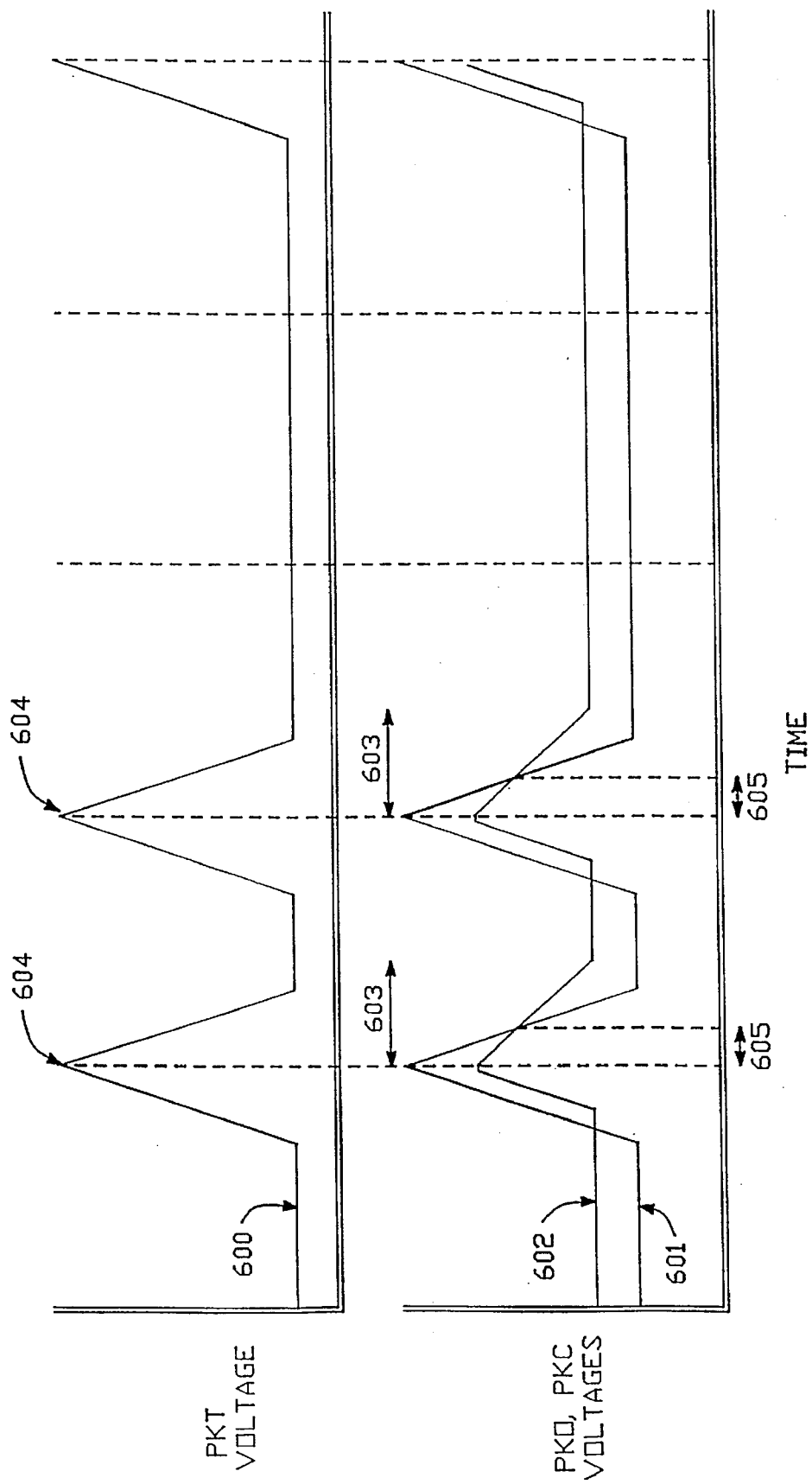
FIG.—11

HIGH SPEED INFRARED COMMUNICATIONS SYSTEM USING PULSE SETS

This application is a continuation of Ser. No. 07/827,004, filed Jan. 28, 1992, now U.S. Pat. No. 5,475,381. The present application is related to U.S. patent application entitled 'Computer with Graphic Interface,' Ser. No. 07/827,076, now abandoned, filed on the same day as the parent to the present application, Jan. 28, 1992, and Ser. No. 08/240,098 pending, a continuation of application Ser. No. 07/827,076, filed May 9, 1994, and now abandoned, each owned now and at the time of the invention, by the same assignee.

FIELD OF THE INVENTION

The present invention relates to the field of infrared communications; and more particularly, to digital communication systems based on transmission and reception of infrared signals.

BACKGROUND OF THE INVENTION

Widespread use of frequencies in the infrared band for communication by telemetry has been made. Using an infrared signal in a business or household environment, however, has been hampered by the large amount of background infrared radiation present. Thus, the uses of infrared communications has been limited to remote control devices for home entertainment systems and the like which are required to communicate a relatively small set of codes with significant redundancy, and do not require the ability to communicate large amounts of digital data at a high rate of speed.

The problem of using infrared communication systems for high speed digital communications is further complicated by the desire to transmit data between battery operated hand-held devices, and a host computer system. These battery operated devices must be able to communicate with relatively low power consumption, therefore, making long high power infrared communication signals impractical.

Therefore, it is desirous to have an infrared communication system, which utilizes relatively low power and communicates data at a high rate of speed, sufficient for transferring files of digital information between the hand-held computer and a host system.

SUMMARY OF THE INVENTION

In the present invention, the transmitter generates an infrared signal that represents a bit stream of binary data. Each binary signal generated by the transmitter has a set of infrared pulses representing one state of the binary signal and a second set of infrared pulses representing a second state of the binary signal. The pulses associated with each state of the binary signal have specific characteristics which enable the receiver to distinguish the transmitted signal from any background radiation. The specific characteristics of each set of pulses, therefore, create in essence a signature which can be recognized by the receiver as implemented within an ASIC.

In one aspect of an invention, a sequence of bits of digital information are generated by a transmitter in which the first binary state of the bit is represented by a sequence of a first signature set of infrared pulses, and the second binary state of the bit is represented by a second signature set of infrared pulses. The signature sets of pulses are detected by a receiver in which an electrical signal is generated by the receiver in response to the detected pulses. The electrical signal is then filtered to detect the signature sets of pulses generated by the transmitter. The signature sets of pulses are then decoded to reconstitute the binary digital signal.

In another aspect, the signature sets of pulses are communicated according to a specific communications protocol for high speed communication of digital data, at greater than 30,000 bits per second.

Other aspects and advantages of the present invention can be seen upon review of the drawings, the detailed description and the claims which follow.

BRIEF DESCRIPTION OF THE FIGURES

FIG. 8 is a timechart showing pulse sets representing bit 1.

FIG. 9 is a timechart showing the transmission of 31,250 bits in one second and sets of pulses representing binary 1 and 0.

FIG. 11 is a stylized diagram showing the timing relationships between the peaks of signal PKT on the upper voltage axis and the "crossing" of signals PKO and PKC on the lower voltage axis.

DETAILED DESCRIPTION

Figure 1:
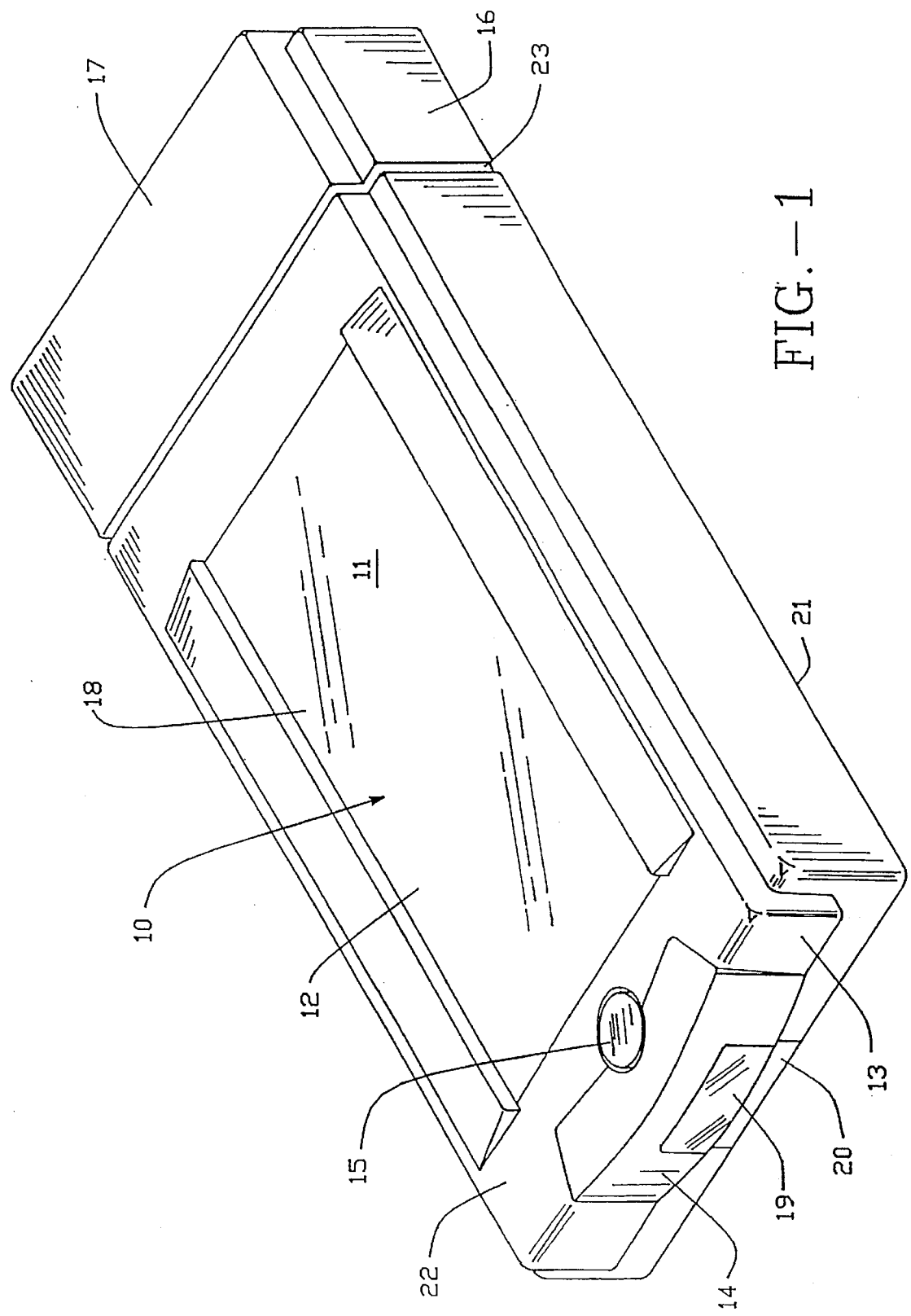
FIG. 1 is a perspective view of a portable computer using the present invention.
Figure 2:
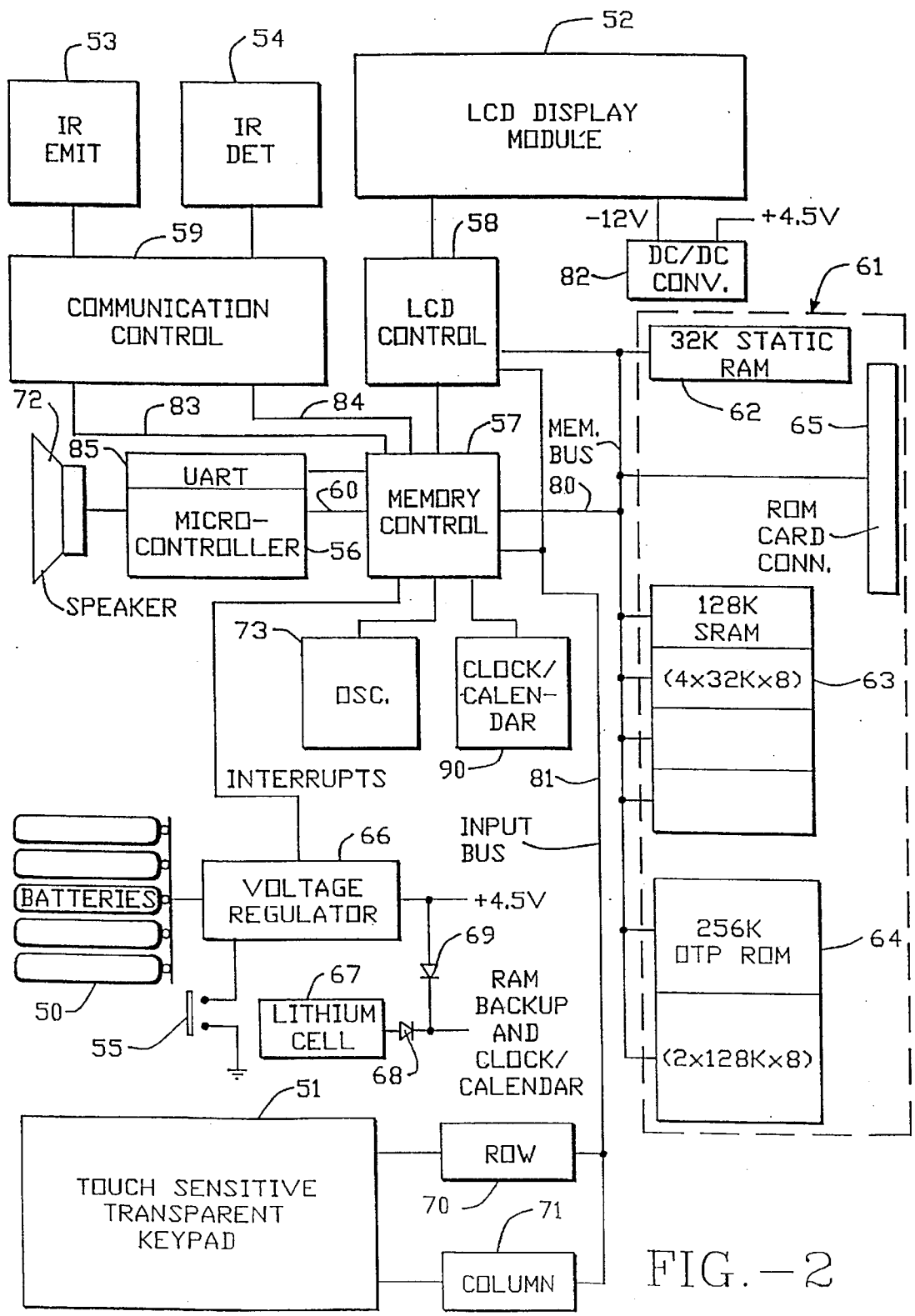
FIG. 2 is a functional block diagram of the computer of FIG. 1 according to the present invention.

A detailed description of a preferred embodiment of the present invention is given with reference to the figures. FIG. 1 shows a perspective view of the computer system. FIG. 2 is a functional block diagram of the computer.

The computer according to the preferred embodiment of the present invention is an extendable, portable, text and graphics processing system, which is small enough to fit into a pocket, such as the standard size breast pocket of a man's suit coat. Inside the casing, data storage, data processing, display, user interface, and communications systems are packaged along with a power supply and storage system.

FIG. 1 shows a perspective view of the casing tablet 10. The tablet 10 can easily fit into a breast pocket of a coat.

The external features of the tablet 10 include a top surface 11, which is dominated by an opening exposing a liquid crystal display 12 with touch sensitive overlay 18. Also, the single mechanical user control switch, called the attention button 15, is provided on the top surface.

The bottom surface (not shown) of the casing incorporates a battery cover for a back-up lithium battery storage, to provide for real time clock power and long term memory retention. Also, on the bottom surface of the casing, an acoustic port is provided through which sound produced by the speaker may emanate to a user.

A infrared lens 19 on a first end 13 of the casing 10 provides an optical port 14 whereby the infrared emitter/detector pair can communicate with compatible peripheral devices.

The placement of the optical port 14 is on the end opposite the battery pack 17. The optical port 14 will be covered by a plastic material, attached to the casing 10, which is optically transparent in the frequency range of the infrared system and optically opaque in the visible light spectrum.

At the second end 16, a battery pack is connected to the tablet. The battery pack shown in FIG. 1 is adapted to hold four AAA batteries. Alternative battery pack designs, such as for AA batteries, could be adapted to fit with the tablet 10. FIG. 2 is a functional block diagram of the computer system which is mounted within the casing 10 of FIG. 1. The system includes battery pack 50, a touch sensitive transparent overlay 51, an LCD display screen 52, the infrared transmitter 53, and an infrared receiver 54. Also, an attention button 55 is included in the circuit.

The processing capability of the computer is provided by microcontroller 56, memory controller 57, LCD controller 58, communication controller 59, and a variety of other elements as shown in the circuit.

The microcontroller, such as the NATIONAL SEMICONDUCTOR HPC46003, is a central processing unit. The HPC has a UART on chip, which is used to support the communications system.

The microcontroller 56 is coupled to the memory control circuit 57 across bus 60.

The memory control circuit 57 provides an interface across memory bus 80 to the storage unit, designated generally by the reference number 61. The storage unit 61 includes static RAM 62 used for a display RAM, a bank of static RAM 63, a bank of ROM 64, and a connector 65 for an external memory cartridge.

The memory controller 57 also manages the input from the touch screen 51 across input bus 81, in combination with the LCD controller 58. The LCD controller 58 manages display refresh and display buffer 62 management.

The batteries 50 of the removable battery pack are coupled to a voltage regulator 66, such as the Intercell ICL 7665S or equivalent, which generates a regulated output voltage for powering the circuits. The primary power is supplied by power packs 50 which provide nominal unregulated 6 voltage DC. A secondary battery 67, or "retention" power source, provides long term power for retention of memory in volatile storage elements on the system. This is supplied, for instance, by a lithium battery, such as EVEREADY CR2032 or the equivalent. The back-up battery 67, is coupled through diodes 68 and 69 to the output of the voltage regulator 66 and to the RAM bank 63 and clock/calendar 90 to provide back-up voltage.

A clock/calendar chip 90 is included, such as the INTERCELL ICM 7170, NSC DP8573, or equivalent. This chip includes a comparer alarm, whereby the CPU designated time month/day, hour/minute is used to generate a clock interrupt, or power on the CPU. When the system is on, the clock/calendar chip 90 is powered by the primary power source. When the system is off, this chip draws power from the back-up lithium battery.

Overlay row and column decoders 70, 71 are connected between the memory controller 57 and the transparent overlay 51 across bus 81. The 4.5 V regulated output of the voltage regulator 66 is coupled to a DC to DC converter 82 to supply negative bias voltage to the LCD display module 52.

The communication control circuit 59 is connected to the memory controller 57 on serial lines 83 and 84, and through the memory controller to UART 85 coupled with the microcontroller 56.

A crystal oscillator 73 is coupled to the memory controller 57 for providing a clock signal.

Infrared emitter 53 and detector 54 are provided for communications with external equipment. The transmitter and receiver have peak power at or near a wavelength of 940 nanometers.

A speaker 72 is coupled to the microcontroller 56.

The system speaker 72 is capable of generating audible tones under control of the CPU.

The system includes a socket 65, interfaced via the memory controller chip, whereby an external ROM or RAM, or hybrid ROM+RAM card may be electronically inserted. This system is compatible with a card such as the ITT CANNON STAR CARD.

These ROM/RAM cards could be available as masked ROM, one time programmable ROM, E2PROM, S/RAM, or other memory devices.

The touch screen 51 overlays the liquid crystal display. It is a transparent resistive overlay controlled by the memory control block 57. It provides 9 bit by 9 bit resolution across the LCD screen. Touching the pad presents a finite resistance across the X and Y directions of the pad. Electrodes are provided for the purpose of interconnections to measure these resistances. When no pressure is applied, a very large or infinite resistance is provided to the electrodes.

The attention button 55 is implemented with an electronically separate section of the touchscreen and acts as single pole, single throw, normally open push button. The button 55 is mounted directly onto the top of the tablet casing. Actuation of the button is accomplished by using a custom plastic piece which fits into the casing. The.switch activates the primary power system when the system is off. When the system is on, the switch provides an interrupt to the CPU via the memory controller 57.

The computer system, when mounted within the casing 10 of FIG. 1, is a monolithic electronic assembly powered by the power packs. The power packs can be provided in any number of configurations, based on variations of battery size. For instance, battery packs could be configured for four AAA alkaline batteries, four AA alkaline batteries, five AA nickel-cadmium batteries, or for attachments to any number of external power supplies.

The user interface consists of the liquid crystal display 52 under the touch screen, the attention button 55, and an input control program as described below. The casing 10 and display 52 is designed to be held and operated in either a portrait or landscape orientation by either a right or left handed person.

The user requests an "interactive power-on" via the attention button 55. Pressing this button will signal a power-up of the processing system.

A power-on can also be initiated by reaching a specific date/time within the clock/calendar chip 90.

When powering on automatically, the apparatus will inform the user via an alarm tone through the speaker and an event specific screen illustrating the reason for the power-on.

The primary user interface on the apparatus is provided by "soft function-keys" as implemented using the bit mapped liquid crystal display 52 and an associated transparent touch sensitive overlay 51.

The processing system is powered down under software control according to a power management scheme.

Low battery capacity is detected by the system for both the primary and long term retention cells, and reported to the user under software control. As a battery saving feature, the unit will automatically turn itself to a low power data retention mode after the preset user adjusted interval, if no user command selection is made.

Peripheral communication is provided by modulated infrared communication media exchanging information with peripheral devices, such as personal computers, modems, keyboards, and the like.

The circuit provides a minimum of 256 kilobytes of 100 nanosecond OTP ROM. This ROM contains the code necessary to perform the basic functions and hardware diagnostics, and store necessary character fonts, hard coded displays, icons, symbols, et cetera. The ROM is accessed in 32 blocks of 8 kilobytes each, under control of the memory controller chip.

A minimum of 128 kilobytes of non-volatile read/write memory (SRAM) is provided. This memory is arranged in 16 banks of 8 kilobytes using four 32 kilobyte static RAMs.

While the system is active, the SRAMs are powered using the primary power source. While the system is quiescent, the SRAM is placed in low power mode and powered from the back-up power cell. Replacement of the back-up power cell can be accomplished only while the unit is connecting to its primary power source.

The system further includes 32 kilobytes of display RAM. This RAM may be a volatile memory, if required. This display memory is utilized by the system as image buffers.

The liquid crystal display provides a 400 by 192 pixel bit map display screen overlaid with a transparent touch sensitive pad.

The CPU processes information in either a portrait or landscape orientation as selected by application code, and appropriate user information. As such, the contrast ratio for the LCD must be reasonably constant as the assembly is rotated through 360°.

The outside dimensions of the LCD are about 6.259 inches by 3.252 inches by 0.315 inches. The viewing area is at least 4.724 inches by 2.267 inches. Center to center dot spacing of 0.3 millimeters is required for the 400 by 192 dot resolution. The panel provides a reflective type LCD with a grey background color.

In the preferred system, the memory controller chip is an application specific integrated circuit. The chip provides.bus control and memory segmentation, interrupt control and identification, power management, and direct memory access functions.

Because the selected CPU provides linear addressing space of only 64 kilobytes, the processor segments memory into banks.

A 16 bit address A15-A0 from the microcontroller is translated into a 21 bit memory address MA20-MA0 by means of the bank registers. The three high order-bits A15-A13 of the microcontroller address are used to address the bank registers. Each bank register stores the eight high order bits of a given memory address MA20-MA13.

Interrupts are generated in the system from the voltage monitor, the attention button, and the clock/calendar chip 90. Upon receipt of an interrupt, the memory controller circuit notifies the CPU of the event, performing a CPU "power-on", if required. The memory controller chip provides a method whereby the processor can uniquely identify the source of external interrupts.

The memory controller chip also provides DMA services in a variety of contexts. Transfer from the image RAM to the LCD drivers, as well as from ROM and SRAM into the blitter, the memory controller provides a two-channel DMA circuit. The DMA is designed to minimize bus contention between the CPU, the blitter, and the LCD controller. This DMA utilizes real addresses, so that it is not constrained by the limited address space of the CPU. In the case of bus conflicts, the LCD controller channel prevails. Bus conflicts between the blitter and the CPU are resolved in favor of the blitter access.

The LCD control chip integrates an LCD controller and the hardware blitter operations.

The LCD controller 58 implements raster scan refresh of the LCD by synchronously accessing image data within the image RAM, serializing it, and shifting it out to the LCD drivers. The CPU provides a base address for a particular display, particularly within the display RAM. Also, this chip provides a blanking signal for disabling the LCD.

The hardware blitter is a registered barrel-shifter combined with a logical function selector. The hardware blitter is capable of read modify-write operations between the image RAM and information contained in either the static RAM or the ROM of the processor. The blitter is capable of performing simple masking (and), merging (or), complimenting (not), filling with ones or clearing with zeros within the image RAM in conjunction with a barrel shifter.

The memory control chip also implements the circuitry necessary to allow the CPU to periodically scan the touch screen.

Registration of the dots of the liquid crystal display and dots on the touch screen is performed in software during user configuration session. The touch screen controller provides a mode whereby the sense of the user touch will awaken the CPU at completion of an X/Y read cycle. The CPU may initiate a touch screen scan based on an internal timer. 9 bits resolution in the long X axis of the touch sensitive screen and 9 bits resolution in the short Y axis is provided.

The hand-held computer, according to the present invention, may be configured for use by either a left-handed or a right-handed user. Because of the location of the transmitter/receiver and because the center of gravity of the computer is such that its balance is better if held near the end having the battery pack, a right-handed user will tend to hold the computer so that the screen has a first orientation and a left-handed user will hold the computer so that the screen is turned over. The touch screen control and the LCD display refresh circuitry are adapted to accommodate either a left-handed or a right-handed user.

In the preferred embodiment, the transmitter of a hand-held computer generates an infrared signal to be detected by a receiver in a personal computer interface or other peripheral device. As shown in FIGS. 8–9, the signal generated is a binary data stream 300, such that each piece of binary data consists of a signature set of two 5 microsecond pulses 302 spaced by 5 microseconds for binary zero 400, and a signature set of no pulses for a binary one 401. Each of these signature sets falls within a 32 microsecond window 301, so that the pulse pairs of successive binary zero signature sets will be separated by 17 microseconds. These signature sets of pulses provide the receiver with the capability of distinguishing the infrared signal sent by the transmitter from any background infrared radiation present, while accomplishing communication at speeds greater than 30,000 bits per second, high enough for communication of digital files by telemetry.

Figure 10:
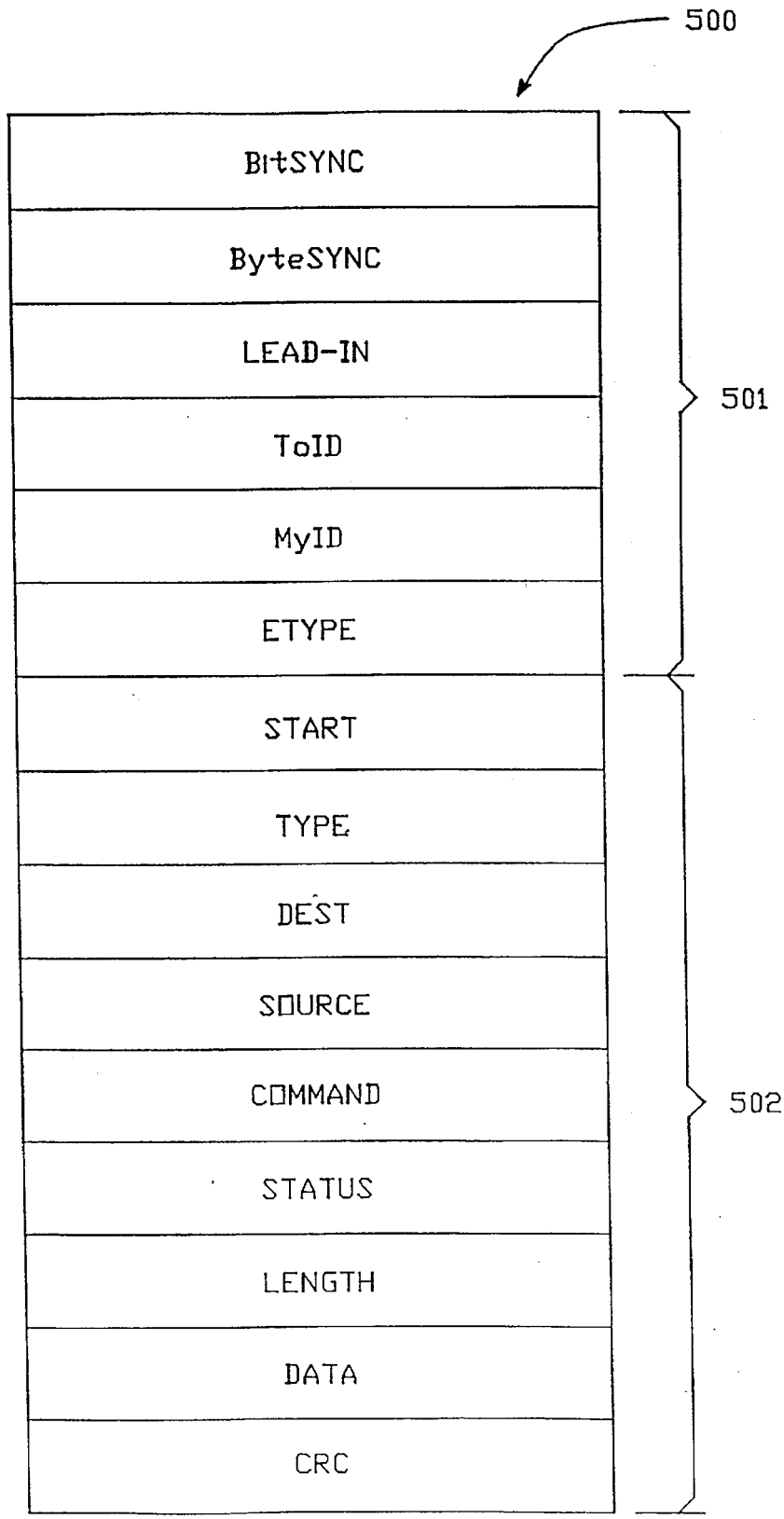
FIG. 10 is a block representation of a data packet.

Communication between the hand held computer and the personal computer interface or other peripheral device is according to a packet protocol. With reference to FIG. 10, each packet 500 communicated by the system consists of a preamble 501 and an optional body 502 of data appropriate, described as follows:

```
PREAMBLE + [BODY]
Every PREAMBLE contains;
    BitSync ¦ ByteSync ¦ Lead-In ¦
        ToID ¦ MyID ¦ Etype ¦ [EData] ¦CRC
Where:
        BitSync  = 20 0x00's
        ByteSync = 3 0xFF's
        Lead-In  = 0x1DA1 (short packet)
                  0xA210 (long packet)
        ToID     = 0 = packet for any
                      unit listening; or
                  = n (0<n<251) = packet for unit
                      with logical ID 'n'
        MyID     = n (1<n<255)=logical ID of
                      the sending unit
        EType    = Type of this packet
                      preamble d7-d4 = Preamble type
           d3 = Repeated transmission
        d2-d0 = Number of preamble [Edata]
                bytes prior to preamble CRC 0x12 = Broadcast Packet (future)
        0x22 = Diagnostic Packet (reserved)
        0x30 = SLAVE WRU
        0x40 = MASTER WRU      (future)
        0x52 = IMA
        0x60 = ZIT (request for 'ACK me')
        0x70 = Solicit
        0x82 = ToYou
        0x91 = ACK
        0xA0 = (reserved)
        0xB0 = (reserved)
        0xC0 = Special 1
        0xD0 = Special 2
        0xE0 = Special 3
        0xF0 = Special 4

[EData] = Envelop data (optional)

[AckStatus]. . . when EType is ACK
[BodyLong]= Number of bytes of BODY contained
    within this packet. May be zero!
    Sent with ETypes:
        0x12 = Broadcast Packet
        0x22 = Diagnostic Packet
        0x52 = IMA
        0x82 = ToYou
Ack Status Bits are dedicated as follows:
    d7 = 0 Version 1.0
    d6 = 0 Version 1.0
    d5 = 1 EMPTY
    d4 = 1 HOST OFFLINE
    d3 = 1 NO HOST/NO CARRIER
    d2 = 1 BODY OVERFLOW
    d1 = 1 GARBAGE
    d0 = 1 FULL;
Where:
    FULL:
        An indication that the unit initiating this
        ACK has no more buffers available for
        another packet.
    GARBAGE:
        An indication that the unit initiating this
        ACK received a packet with a bad BODY CRC.
        NOTE: This could also be an indication of
        a failure in the preamble CRC.
```

-continued

```
BODY OVERFLOW:
    An indication that the unit initiating this
    ACK received a packet where the body
    'length' exceeded the available buffer size.
NO HOST/NO CARRIER:
    Status bit indicating that the unit
    initiating this ACK does not currently have
    a host that is responding to any traffic.
    This is generated by the vPCI and MODEM
    peripherals only.
HOST OFFLINE:
    Status bit indicating that the unit
    initiating this ACK is connected to a HOST
    but that the HOST has notified this unit
    that it is unavailable. This is typical
    when, for example, a Personal Computer
    Interface (PCI) is connected to a host,
    communications has occurred, but the host is
    not currently executing compatible code.
EMPTY:
    Status bit indicating that the unit
    initiating this ACK has no filled and/or
    valid packets to report (or be solicited).
```

The optional body of a packet has the following format:

```
Start ¦ Type ¦ Dest ¦ Source ¦ Command ¦ Status
¦ Length ¦ Data ¦ CRC
Where:
    Start - varies from 0 to 255, used for
            synchronization of packet
            transfers. (One unique value
            could suffice.)
    Type - packet type
        1 = Data Packet
        2 = Command Packet
            (can have status from last xfer)
        3 = Status Packet
    ECC long Pkt - (D7 on for the above types)
                   (PC will never see this type)
    Destination Bit Assignments -
        1  = PC SPO
        2  = HH SPO
        3  = HH ATP
        10 = PCI ATP
        11 = Printer
        12 = Barcode
        13 = Modem
        20 = Network
        30 = Keyboard
    Source Bit Assignments -
        1  = PC SPO
        10 = HH SPO
        11 = PCI ATP
        12 = Printer
        13 = Barcode
        14 = Modem
        21 = Network
        31 = Keyboard
    Command Bit Assignments -
        0  = Null Command (just more data in this packet)
        1  = Begin Session
        10 = End Session
        11 = Abort Session
        20 = HH Receiver ready
        21 = Resend N
    Status - Bit Assignments
        1  = Ack
        0  = Nack
        10 = PCI Time-out on IR (only issued to PC)
        11 = PCI Time-out on PC (only issued to HH)
        20 = HH Time-out on PCI
        21 = PC Time-out on PCI
    Length -. length of Data Field (usually Zero for
             Status Packets)
    Data - variable length
    The 'Application Data' would employ a complete
```

-continued substructure of what is being sent (all receives are presumed to be pre-authorized for size constraints).
CRC - of entire packet Example sessions between a hand held computer HH and a personal computer PC are set out below.

HH to PC transfer:
  PC-Start Session CMD
  PCI-Waits for IR CMD
  HH-Start Session CMD (needed? )
  PCI-Acks HH if good CRC, else NACK
  PCI-sends to PC
  HH-sends data
  PCI-as it's reading from IR, begins sending it up to the PC
    when it's all read in from the IR, and if CRC good, then ack HH (we're still shipping it to the PC)

PC to HH transfer:
  PC-Start Session CMD
  PCI-Waits for IR CMD
  HH-HH receiver ready CMD
  PCI-Acks HH if good CRC, else NACK
  PCI-gets from PC, building CRC when done, Start shipping it to the HH
  HH-receiving data
  PCI-as it's sending data to the HH, begins getting more from the PC
    when it's all sent to the IR, waits for Command or Status packet from HH. Could be CMD packet with ack status & and HH Receiver ready (for more data) or end session.

Specific types of communications packets could be as follows:

EDPKT+<Tabname>+<Subtab name>+<Flags: G-up, G-down>+<#of entries>+<Remote EntryID, Entry Record>+. . . +<Remote EntryID, Entry Record>+<EOP>

This is the packet that is returned to the HH from the PC, after the HH had issued the REDPKT call for the computer system described in the above referenced application entitled "Computer with Graphic Interfaces". It consists of the Tab and Subtab names for the top line of the display, ghost flags, indicating whether to ghost the Up and/or Down buttons, the count of entry records in this packet, and the actual Remote Record ID's and Data. The PC only returns those records that can fit on the HH's display. The Entry data in this packet do reflect the Entry Record structure.

PassCode Request Packet-(PC to HH)
  PCRQPKT+<EOP>

This packet is returned to the HH when a passcode is required to access a Tab, Subtab, or Page display. The HH should put up the passcode gadget, get the user's passcode, stuff it in the request, and re-issue the call.

Request Tab Display Packet-(HH to PC)
  RTDPKT+[optional Passcode]+CRC

The HH issues this call after the user has selected the Remote button to get the Tab display of the Remote. The PC will either return a PCRQPKT or the Tab data with a TDPKT.

Request Subtab Display Packet (HH to PC)
  RSDPKT+<Slot #>+[optional Passcode]+CRC The HH issues this call after the user has selected a Tab Slot to get the Subtab display of the Remote. The PC will either return a PCRQPKT or the Subtab data with a SDPKT.

Request Form Packet-(HH to PC)
  RFMPKT+<Subtab Slot #>+CRC

The application issues this call when the user has selected a Subtab to open. The PC will either return a PCRQPKT or the form data with a FMPKT. After the application has received the FMPKT, it should issue a REDPKT to get the first page of data.

Request Entry Display Packet-(HH to PC)
  REDPKT+<Flags: First |Next |Prev>+CRC

The application issues this call when the user has selected a Subtab to open. The PC will either return a PCRQPKT or a page worth's of display data with a EDPKT.

Request Export of Packet-(HH to PC)
  REXPKT +<Remote ID>+[optional passcode]+CRC When copying or moving, and after the user has selected where to move/copy the data to, the application should issue this call to actually get the record associated by the Remote ID. To get all of the data associated with a Tab or Subtab, the HH should walk the chain and request each record separately—the PC is not going to send back more than 1 record at a time. The PC sends the data back with the R4UPKT packet.

Request Import of Packet-(HH to PC)
  RIMPKT+<Record Length>+<My Record ID>+ <Remote Insert-after ID or Slot #>+<Record data>+ CRC The HH uses this call to send a record to the PC. Again, as with the REXPKT call, to send all of the data associated with a Tab or Subtab, the HH should walk the chain and send each record separately-the PC hasn't any knowledge of the HH's linkages. If the Remote Insert-after ID is zero, then it goes at the beginning of the chain. This field can be a slot number if the HH is on a Tab or Subtab display.

Record For You Packet-(PC to HH)
  R4UPKT+<Remote Record ID>+<Record Length>+ <Record Data>+<EOP>+CRC The PC returns this packet with a record in it after the HH has made the REXPKT call. If a passcode is required, the PC will return the PCRQPKT function instead, and the application, after receiving the user's passcode, should re-issue the REXPKT call.

From the perspective of the HH, since it's the master, these are the calls to the communications system:

Tab DisPlay Pkt-(PC to HH)
  TDPKT+<Slot #>, <Text>+. . . +<Slot #>, Text>+ <EOP>+CRC This is the packet that is returned to the HH from the PC, after the HH had issued the RTDPKT call. It consists of the Slot Number and Tab Name for each of the allocated Tabs of the remote book. The data in this packet do not reflect the structure of allocated tabs in the current operating point.

Subtab Display Pkt-(PC to HH)
  SDPKT+<Tabname>+<Remote SubID>+<Slot.#, Text>+. . . +<Slot#, Text>+<EOP>+CRC This is the packet that is returned to the HH from the PC, after the HH had issued the RSDPKT call. It consists of the Tabname for the top line of the display, the remote Subtab ID, and the Slot Number and Subtab Name for each of the allocated Subtabs of the remote book. The data in this packet do not reflect a Subtab record structure.

Form Packet-(PC to HH)
  FMPKT+<Remote FormID>_<Form Record w/out p-code>+<EOP>+CRC This is the packet that is returned to the HH from the PC, after the HH had issued the RFMPKT call. It consists of the FormID of the remote book's form for the slot the user selected on the remote Subtab display, and the form record data. The data in this packet does reflect the Form record structure, but without any p-code. The application (or RMGR) should check whether the HH already has this form by comparing the form's unique catalog number. If it does have the form, it should ignore the data.

A detailed description of the preferred embodiment of the receiver in the personal computer interface or other peripheral device is given with reference to the figures.

Figure 3:
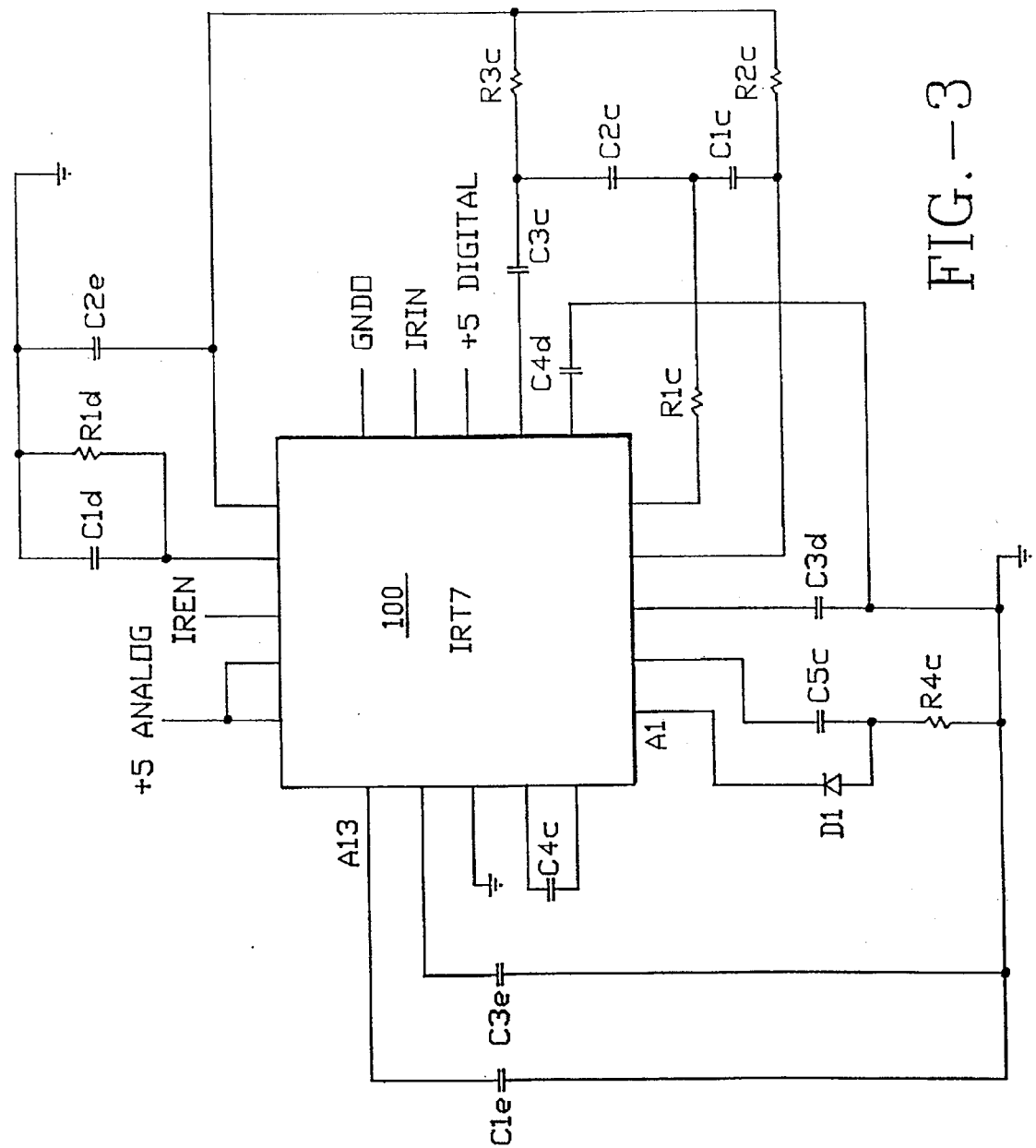
FIG. 3 is a diagram of the infrared communications receiver of the present invention

FIG. 3 shows the overall design of the Infrared communications receiver and signal processor 100. The circuit processes an analog IR signal A1 produced by diode D1 receiving an infrared signal, in such a way as to produce a digital representation IRIN at output D4 of the infrared signal.

An infrared signal is detected by the IR detector diode D1. This diode D1 generates a series current approximately proportional to $$K(1/(DISTANCE)^2),$$

where K is a circuit constant, and DISTANCE is the distance between the source of the IR signal and the IR diode surface.. The series current is amplified, compressed, filtered, and converted to a digital signal that appears at output D4. The D4 output signal referred to as IRIN is coupled to the communication controller 59 of FIG. 2. The communication control 59, recovers and processes the digital bit stream from IRIN.

Digital input signal IREN is used to put the receiver 100 circuit into a low power standby mode when not in the process of receiving a valid IR input signal.

FIG. 3 also indicates external circuitry which is connected to the receiver 100. In this respect, external capacitor C1e is connected between pad 4 and analog ground. External capacitor C3e is connected between pad 5 and analog ground. External capacitor C4c is connected between pads 7 and 8. Pad 9 is connected to diode D1. In turn, diode D1 has a common connection between external capacitor C5c and external resistor R4c. External capacitor C5c is also connected to pad 10, and external resistor R4c is connected to analog ground. Connected between pad 11 and analog ground is external capacitor C3c. Connected between pad 14 and analog ground is external capacitor C4d. Pads 12, 13, 15, and 19 are all connected. Pad 12 is connected to a common connection between external capacitor C1c and external resistor R2c. Pad 13 is connected to external resistor R1c, which is, in turn, connected to a common connection between external capacitors C2c and C1c. Pad 15 is connected to external capacitor C3c, which is, in turn, connected to a common connection between external resistor R3c and external capacitor C2c. Pad 19 is connected to a common connection between external capacitor C2e, external resistor R3c, and external resistor R2c. External capacitor C2e is then connected to analog ground. Connected in parallel between pad 20 and analog ground are external capacitor C1d and external resistor R1d.

Further connected to receiver 100 are +5 voltage supplies and ground connections. Analog+5 volts is connected to pad 3. Analog ground is connected to pad 6. Digital +5 volts is connected to pad 16. Digital ground is connected to pad 18.

Figure 4:
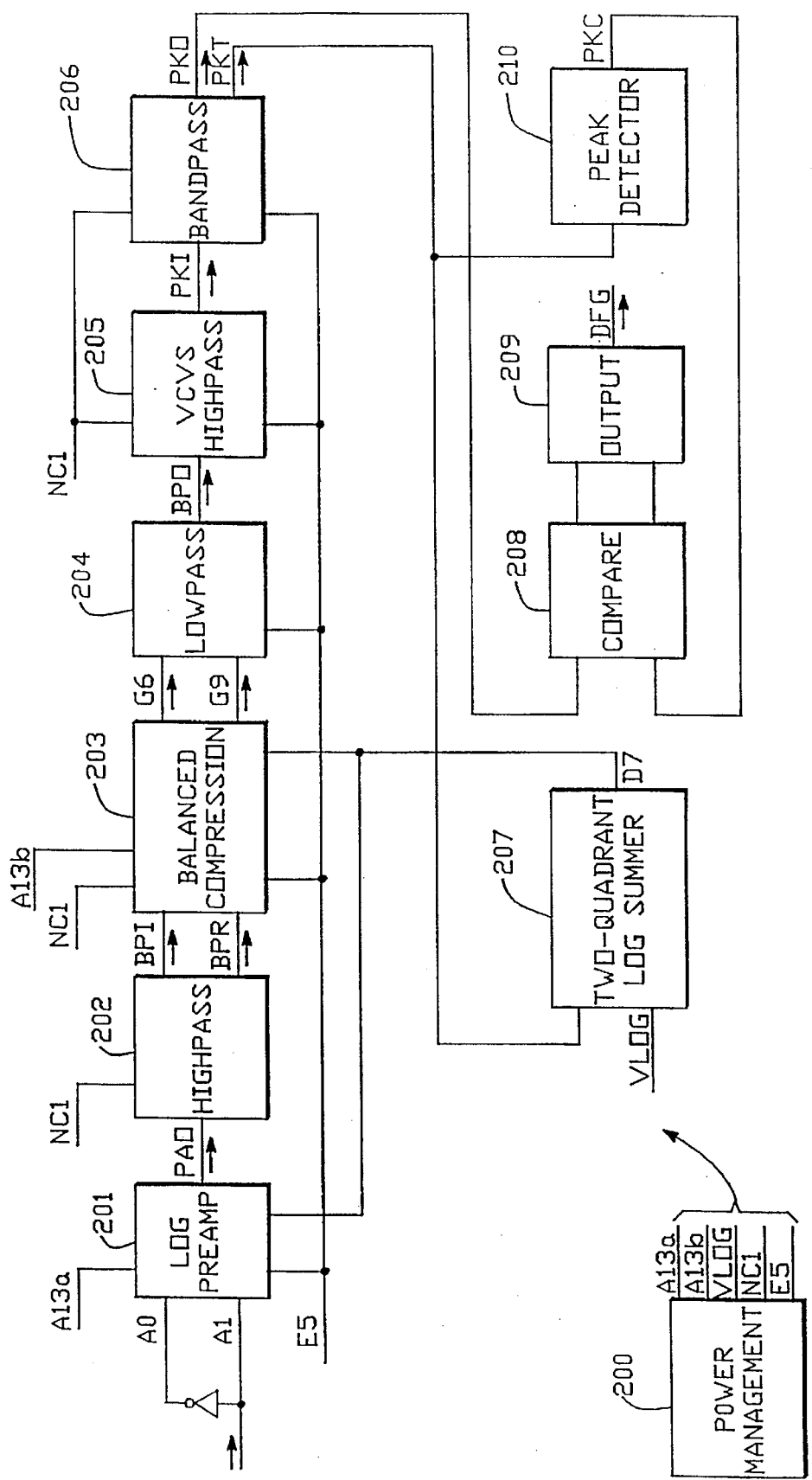
FIG. 4 is a block diagram of the power management and biasing and main sub-circuits of the communications receiver.

The internal circuitry of receiver 100 consists of power management and biasing 200, and the subcircuits 201–210 set forth in FIG. 4. Power management and biasing 200 and the main subcircuits in FIG. 4 are connected as follows:

The power management and biasing subcircuit 200 establishes internal reference voltages A13a, A13b, VLOG, C1, and E5.

The logarithmic pre-amp 201 receives the non-inverted and inverted IR inputs A0 and A1, respectively. The internal reference nodes, A13a and E5 are also connected to pre-amp 201. It is further connected to node D7 from subcircuit 207 discussed below. The output PA0 of the logarithmic pre-amplifier 201 is connected to highpass filter 202.

This highpass filter 202 is coupled to internal reference node NC1. From the highpass filter 202, the inputs to a balanced bridge compression amplifier 203 are BPI and BPR.

The bridge amplifier 203 is also coupled to internal reference nodes E5, NC1, and A13b, and node D7. The bridge amplifier 203 output pair G5 and G9, is connected to the lowpass filter amplifier 204.

This lowpass filter amplifier 204 is also coupled to reference node E5. Its output BPO is the input to the VCVS highpass filter 205.

This filter is coupled to nodes NC1 and E5. The output of this VCVS highpass filter 203 is connected to the high impedance node PKI.

The bandpass 206 filter is connected to the high impedance output PKI, to nodes NC1 and E5. The output PKT of the bandpass filter 206 is input of two quadrant log summer 207 and to the peak detector 210. The second output PKO of the bandpass filter 206 is input to the comparator 208.

The two-quadrant log summer 207 has an input reference, VLOG; and establishes the voltage at node D7.

The peak detector 210, as previously noted, has the input signal PKT. Its output signal, PKC, is input to the comparator 208 along with the output signal PKO of the band pass filter 206.

The outputs of the comparator 208 are nodes D8 and D9. These nodes connect a reset-set (RS) current mode flip-flop and a shunt totem pole, referred to as output 209.

The output 209 supplies a digital stream at the node DFG, which is labelled output D4 on receiver 100 in FIG. 3.

Figure 5:
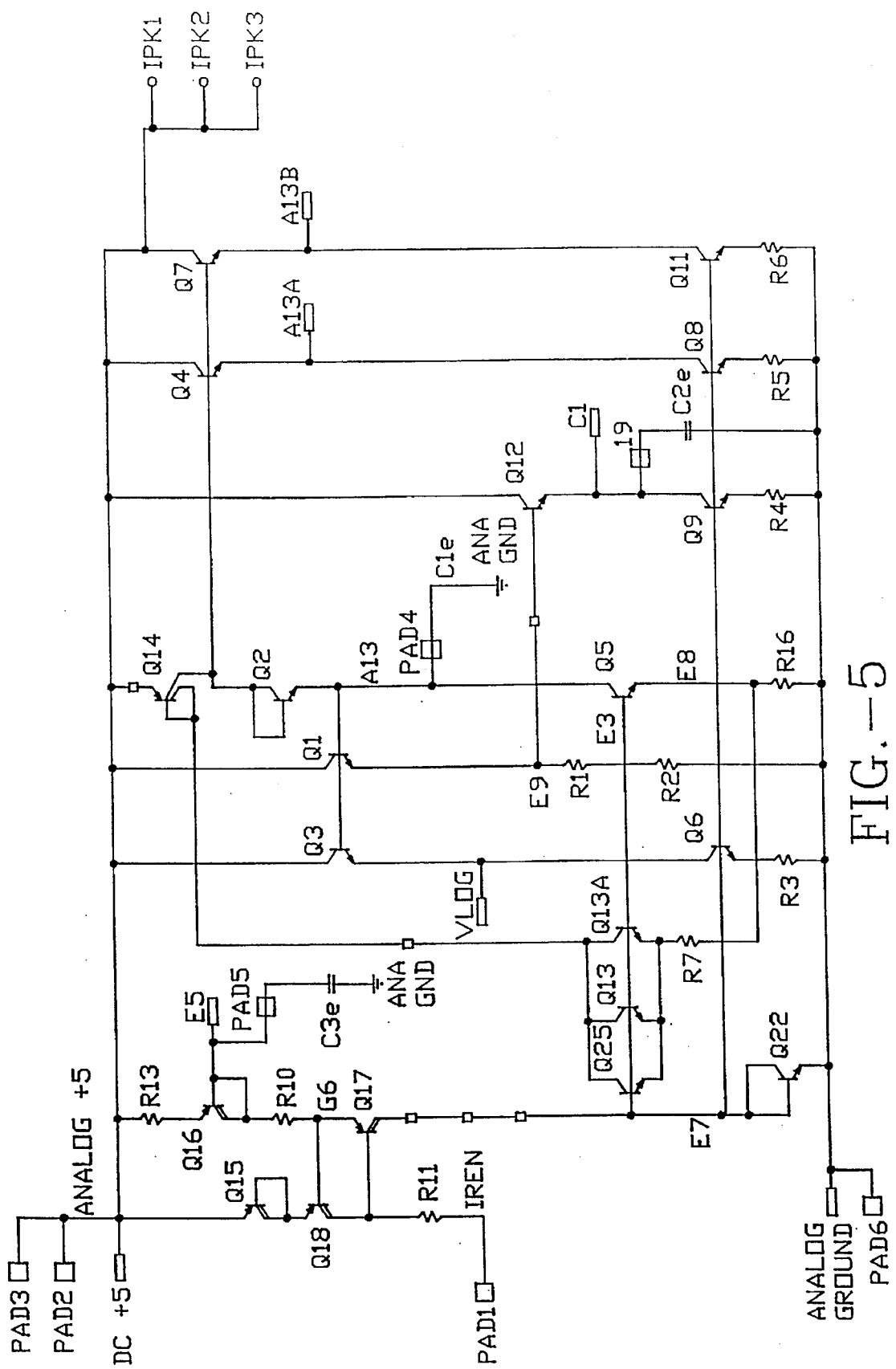
FIG. 5 is a schematic of the power management and biasing circuits of the receiver.

The main subcircuits of the receiver 100, illustrated in FIG. 4 are described specifically as follows in FIGS. 5, 6, and 7:

Set forth in FIG. 5 is power management and biasing.

Key to meeting the design objectives of the receiver is the need to generate three reference voltages that have low stand-by power, track over temperature and quickly stabilize when the receiver is enabled.

In this configuration, IREN is connected to resistor R11. The split collector of transistor Q18, the base of transistor Q17, and resistor R11 are connected. The split collector of the diode-connected transistor Q15 is connected to the emitter of transistor Q18. While the emitter of transistor Q15 is connected to −DC+5. Resistor R13 is connected between DC+5 and the emitter of diode-connected transistor Q16. The split collector of transistor Q16 is connected to resistor R10. Node E6 connects resistor R10, the base of transistor Q18, and the emitter of transistor Q17.

When the. receiver 100 is in the inactive state (+5v), the power manager must reduce the internal bias currents to very low standby values while maintaining proper internal reference voltages. This must be done in such a way as to minimize the power consumption while maintaining a low turn-on latency time. When IREN is at +5, transistors Q15, Q16, Q17, and Q18 are current starved to where their collector currents are <10 na.

In the active mode (IREN=0 volts), the base of transistor Q16, establishes a reference bias voltage at node E5. Connected to the node E5 is the external capacitor C3e. The voltage difference between node E5 and node E6 determines the active bias current used in the power supply, this current is mirrored in transistor Q22 and scaled by transistors Q6, Q9, Q8 and Q11. In the current mirror, the diode-connected transistor Q22 is connected to the collectors of transistor Q17 and to the bases of transistors Q6, Q9, Q8, and Q11. Between the emitters of transistors Q6, Q9, Q8, and Q11, and analog ground are the resistors R3, R4, R5, and R6. The collectors of transistors Q6, Q9, Q8, and Q11 are connected, respectively, to the internal reference voltages VLOG, NC1, A13a, and A13b.

The E5 voltage also determines the bias currents used in the balance of IRT7.

The internal reference voltage at node A13 is maintained via a temperature stabilized, shunt differential regulator 300 whose output voltage is roughly determined by the expression:

$$A13 = (R1+R2)/R2[V_{be}Q5 + \ln(Q13/Q5)(R16/R7)(kT/q)] + V_{be}Q1.$$

The exact voltage is determined by the emitter current density of transistors Q1, Q13, and Q13A and Q5, which affects their respective $V_{be}$'s. The collector of transistor Q1 is connected to analog+5. In this circuit, the diode-connected transistor A14 is connected to the collectors of the parallel combination of transistors Q13 and Q13a. In this configuration, the collectors of transistors Q13 and Q13a are connected to the diode-connected transistor Q14. The emitters of transistors Q13 and Q13a are connected to resistor R7. Node E8 connects resistor R7, the emitter of transistor Q5, and resistor R16. R16 is then connected to analog ground. Connected between the emitter of transistor Q1 and node E3 is resistor R1. Connected between node E3 and analog ground is resistor R2. Also connected to node E3 are the gates of transistors Q13, Q13a, and Q5. The base of transistor Q1 and the collector of Q5 are connected to node A13.

The nominal A13 voltage at 27° C. is 3.236v. Transistor Q25 acts as a start-up circuit to force current into the transistor $V_{be}Q14$ junction in the unlikely situation that the regulator does not initialize at power-up. Once the regulator is initialized, transistor Q25 is essentially inactive by virtue of its $V_{be}$ being <300 mv. For this function, transistor Q25 is connected in the same fashion as transistors Q13 and Q13a.

The A13 node voltage is level shifted up through transistor Q2 and then down via transistors Q4 and Q7. This produces node voltages A13a and A13b with source impedances determined by the tail currents of transistors Q8 and Q11. This technique isolates the voltage at node A13 from switching transients generated in the preamplifier and bridge circuits. For this function, the diode-connected transistor Q2 and transistors Q4 and Q7 are connected in a current mirror arrangement. Further, the gate of transistor Q14 is connected to the gate-collector connection of transistors Q2, Q4, and Q7.

The VLOG voltage is established by shifting node voltage A13 down one $V_{be}$ via transistor Q3. To do so, the gate of transistor Q3 is connected to node A13, the collector of transistor Q3 is connected to node analog+5, and the emitter of transistor Q3 is connected to node VLOG. Further, the node C1 is connected to the emitter of transistor Q12 and the collector of transistor Q9. The base of transistor Q12 is connected to node E9 and the collector of transistor Q12 is connected to analog +5.

In the active receive mode, the 58 μamp flowing through resistors R3, R4, R5 and R6 determine the absolute emitter current density of transistors Q3, Q12, Q4 and Q7, this in turn sets the active output node voltages of VLOG, C1, A13a and A13b. Node voltages C1, A13a and A13b stabilize within a few micro-seconds (μS) while NC1 takes 600 μS.

In the shut-down mode, the current through transistor Q22 is reduced to near zero, this reduces the emitter current density of transistors Q3, Q12, Q4, and Q7, which causes nodes VLOG, A13a and A13b to rise and track.

External capacitor C1e is the main by-pass capacitor and serves to isolate all the reference voltages from each other. It is connected to Pad 4.

The net result of maintaining the reference voltages while lowering the bias currents is to reduce the circuit recover time from large IR overdrive signals, while simultaneously having low standby power.

It should be noted that the resistors values shown as 1 ohm are for reference purposes and do not physically exist in the design.

Also note resistors shown as RXUN are approximately 40 ohms and are used in the circuit routing process.

Figure 6:
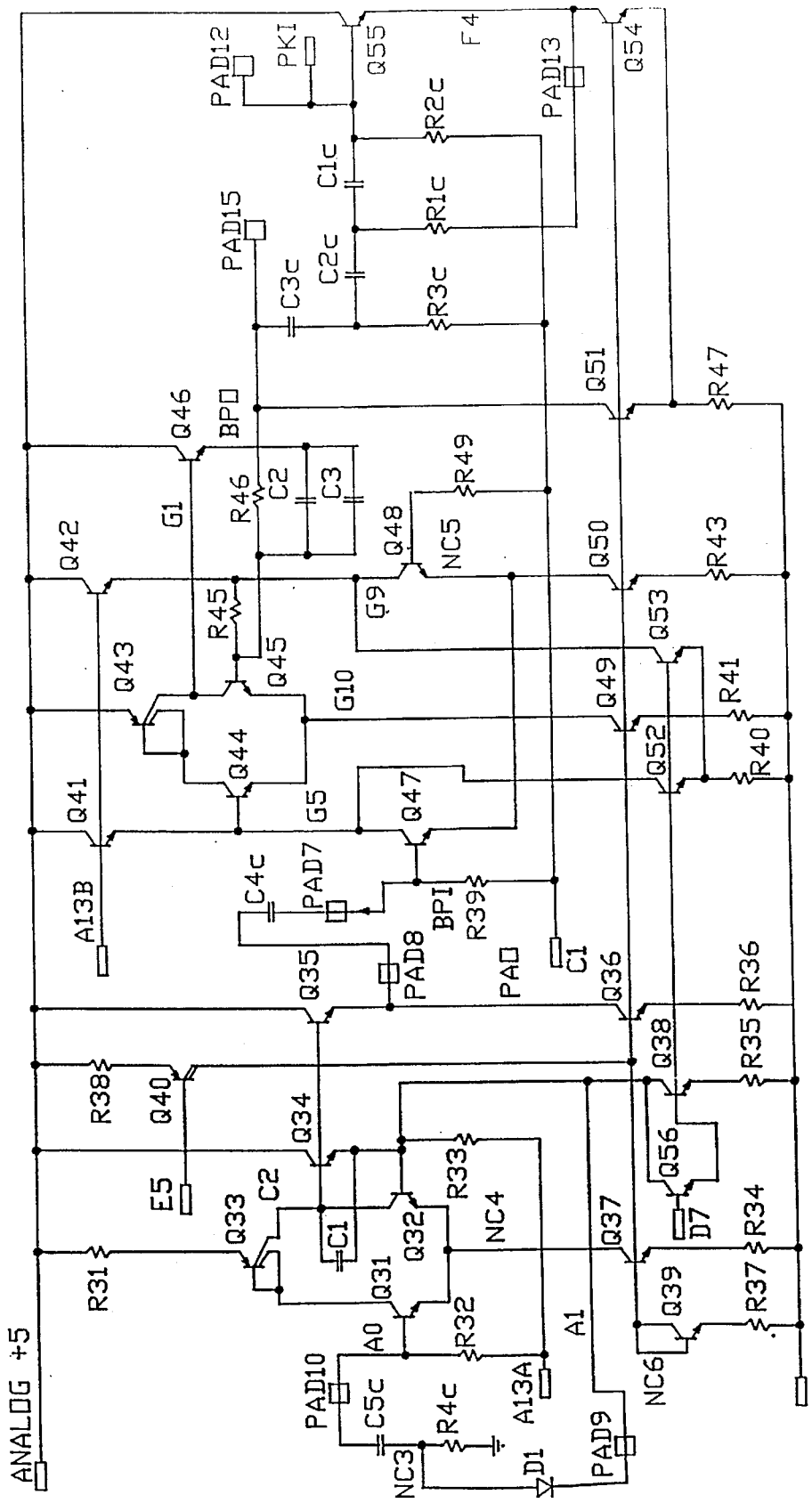
FIG. 6 is a schematic of the log pre-amp, high-pass filter, balanced compression amplifier, pseudo-differential low-pass filter amplifier and VCVS high-pass filter amplifier circuits of the receiver.

Indicated in FIG. 6 are the preamplifier, highpass bridge amplifier, lowpass amplifier, and VCVS filter circuits.

The preamplifier itself is composed of transistors Q31, Q32, Q33, Q34, Q35, Q36, and Q37. It is important that this amplifier be, low noise, wide bandwidth and immune to gross overload signals. The design is a logarithmic current to voltage converter. It can convert a 100 khz current source signal with signal strengths of from 50 nanoamps, to 50 microamps, to a logarithmic voltage equivalent at node C2. In the pre-amplifier, the emitters of transistors Q31 and Q32 are connected to the collector of transistor Q37. The collector of transistor Q31 is connected to the diode-connected transistor Q33. The collector of transistor Q32 is connected to the node C2. The node C2 connects the collector of transistor Q33, capacitor C1, the base of transistor Q34, and the base of transistor Q35. Resistor R31 is connected between analog+5 and the emitter of transistor Q33. Connected to the base of transistor Q40 is the reference bias voltage E5. Resistor R38 is connected between analog+5 and the emitter of transistor Q40. The split collector of transistor Q40 is connected to the bases of transistors Q37 and Q36.

The pre-amplifier is unconventional in that the non-inverting input (A0) is AC coupled to the base of transistor Q31 via external capacitor C5c to the IR diode D1 resistor load R32, while the inverting input (A1) acts as a current summing node for IR signal current. The non-inverting inputs time constant, determined by resistor R32, external resistor R4C, and external capacitor C5c, working as a DC restoration circuit acts to increase the effective gain of the preamplifier by pushing the operating point of the logarithmic converter into a more sensitive operating range. In this circuit, external capacitor C5c is connected between diode D1 and through pad 10 to resistor R32. Resistor R32 is connected to resistor R33. Pad 9 connecting diode D1 and resistor R33 is connected to the base of transistor Q32.

This increased sensitivity is only for signal frequencies that are above the input pole frequency. The voltage at the base of the logging transistor (Q34) is determined by its emitter current density. The current density is the sum of four currents. The first is the actual IR signal current, the second is the current developed through resistor R33 by virtue of the IR signal voltage appearing across external resistor R4c and resistor R32 in parallel, the third is the compression current injected by transistor Q38's collector, and the fourth is the base current of transistor Q32.

The base-emitter voltage of transistor Q34 is $V_{be}Q34 = (KT/Q)*[\ln(I_eQ34/I_o)],$ Where K is Boltzmanns Constant
T is Absolute Temperature
Q is charge on a electron $I_o$ is leakage current Ie is $\{IR\}*[1+)R3 \|R32)/R33]+I_cQ38+I_bQ32$ Resistor R31 is used to raise the output impedance of transistor Q33. Resistor R31 is connected to analog ground and then is connected to the emitter of transistor Q33. This provides higher gain accuracy in transistor Q32's collector circuit.

The early voltage off-set caused by the split collector configuration of transistor Q33 is not sufficient to cause more then a few hundred micro volts of additional offset in the input differential pair.

Transistor Q39 and resistor R37 form a current mirror that is scaled by transistor Q37 and R34. The diode-connected transistor Q39, is connected to transistor Q37. The emitters of transistors Q39 and Q37 are connected to resistors R37 and R34, respectively, which are in turn connected to ground. The tail current for the transistor Q31, Q32 pair is 160 μA.

This configuration produces a logarithmic signal at the base of transistor Q34 that is relatively immune to signal overload and saturation effects.

Transistors Q35 and Q36 form a unity gain voltage buffer that drives output PAO. The collector of transistor Q35 is connected to analog +5; the base of transistor Q35 is connected to the base of transistor Q34; and the emitter of transistor Q35 is connected to the collector of transistor Q36. The base of transistor Q36 is connected to the current mirror of transistors Q39 and Q37, while resistor R36 is connected between the emitter of transistor Q36 and analog ground. The output impedance should be a nominal 1000 ohms.

Intrinsic to the operation of the receiver is the cumulative effect of the (phase) group delays in the bandpass and VCVS filters. It is these delays that develop the transient profile necessary for the decoder to track bit to bit amplitude changes.

The highpass balanced bridge compression amplifier is composed of transistors Q47, Q48, Q41, Q42 and Q50. In this amplifier the gates of the bridge input pair of transistors Q47 and Q48 are connected to nodes BPI and BPR, respectively. Node BPI is connected to external capacitor C4c and is referenced to node C1 through resistor R39. Node BPR is referenced to node C1 through resistor R49. There is a common connection between the emitters of this input pair and the collector of transistor Q50. The gate of transistor Q50 is connected to node C6, while the emitter of this transistor is connected to resistor R43, which is, in turn, connected to analog ground. In the output bridge pair of transistors Q41 and Q42, the gates are referenced to node A13b, the collectors are connected to analog+5 and the emitters are connected to the nodes G5 and G9, respectively.

This amplifier provides a nominal dynamic output load of 5K ohms. The impedance will range between 50 and 5K ohms under varying signal conditions. Transistors Q52 and Q53 collector currents provide the compression for character-to-character load adjustment to scale and shape the incoming signal. The collectors of transistors Q52 and Q53 are connected to the nodes G5 and G9, respectively. The gates of these transistors are connected to the emitter of transistor Q56, which, in turn, is biased by internal reference signal D7. The emitters of these transistors are connected to resistor R50, which is connected to analog ground.

The amplifier also establishes a signal filter pole at approximately

Frc=½*Pi*C4c* (R39+$R_e$Q35)–53 Khz,

Where R39=5K ohms $R_e$=1K ohms

C4c=500pf

The differential input pair, transistors Q47 and Q48, are referenced to voltage C1. The output differential bridge pair consist of transistors Q41 and Q42. The reference voltage for transistors Q41 and Q42 is node voltage A13b. This isolates the signal currents and load impedances ($R_e$Q41, $R_e$Q42) from the power supply filter node (A13).

The bridge output pair are DC coupled to a pseudo differential lowpass filter amplifier composed of transistors Q44, Q45, Q43, Q46, Q41 and Q49. In this configuration, the emitter of transistor Q43 is connected to analog+5. The diode-connected transistor Q43 is connected to the collector of transistor Q44. Node G1 connects the base of transistor Q43, the collector of transistor Q45, and the base of transistor Q46. Connected to node G9 are the emitter of transistor Q42 and the resistor R45. Node G6 connects resistor R45 and the gate of transistor Q45. Also connected by node G6 are resistor R46, and capacitors C32 and C33. Node BPO connects the emitter of transistor Q46, resistor R46, and capacitors C32 and C33. The emitters of transistors Q44 and Q45 are connected to transistor Q49. The gate of transistor Q49 is connected to node C6, and the emitter of this transistor is connected to resistor R1, which is connected to analog ground. The lowpass gain is equal to R46/(R45+ReQ42).

Output signal BPO drives the input of the Voltage-Controlled Voltage Source (VCVS) highpass filter.

The three pole VCVS highpass filter is composed of transistor Q55, Q54, external capacitors C1c, C2c, C3c, and external resistors R1c, R2c, R3c.

Transistor Q55 forms a unity gain feedback buffer with transistor Q54 providing a tail current of ½ I(R47) or 38 ua. This yields an output feedback impedance of 685 ohms. In this configuration, node BPO is connected to external capacitors C3c and C2c, and external resistor R3c. Also connected are external capacitors C2c and C1c and external resistor R1c. Connected to node C1 are external resistors R3c and R2c. Connected by node PKI are external capacitor C1c, external resistor R2c, and the gate of transistor Q55. The collector of transistor Q5 is connected to node analog+ 5. Node F4 connects the emitter of transistor Q5, external resistor R1c, and the collector of transistor Q54. The gate of transistor Q54 is connected to node C6. Connected are the emitter of transistor Q54, the emitter of transistor Q51, and resistor R17. Resistor R17 is connected to analog ground.

The filter is specifically referenced to C1 with its output being the high impedance node PKI, as opposed to the more conventional low impedance node F4. This configuration is necessary to ensure proper head-room and bias tracking of the succeeding stages.

Over and above the logging action of the preamplifier and differential bridge, a scaling signal is used to prevent saturation of the remaining circuitry. This signal is applied to internal node D7. The resulting current, in resistors R40 and R35, is used to compress the logging range of their respective amplifiers.

Note that the term Automatic Gain Control is deliberately avoided. AGC has a connotation that is inappropriate in this case. The distinction is that within the 66 db compression range, the logarithmic amplifiers can accurately process a 40 db bit-to-bit change that would be totally missed by "AGC". One may argue this is a matter of semantics, never the less, the entire circuit concept will not work with "AGC" alone, the receiver must be centered around the dynamic operating characteristic of the logarithmic converters.

Figure 7:
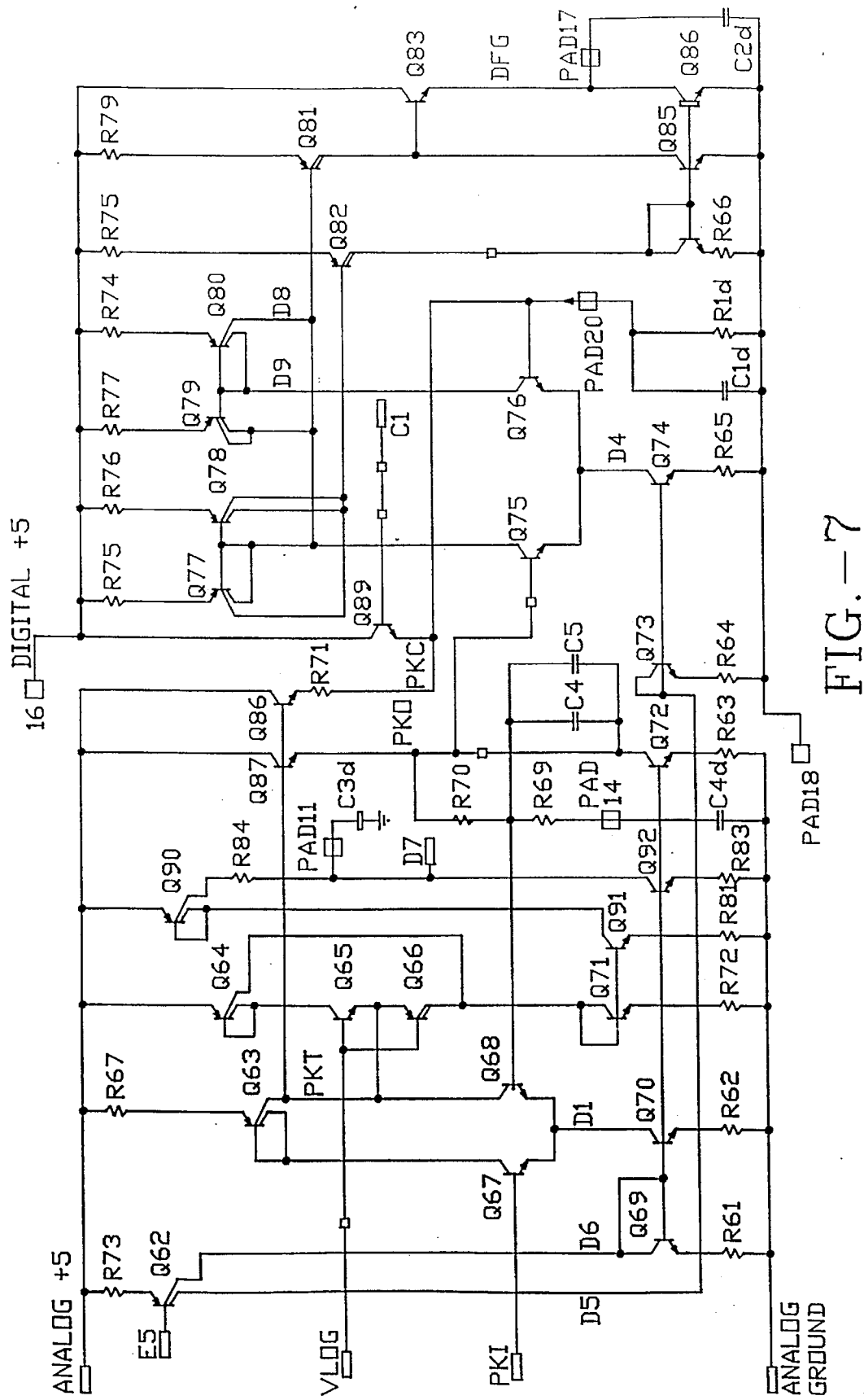
FIG. 7 is a schematic of the active band-pass filter, two quadrant voltage-to-logarithmic current convertor, peak detector, comparator, analog output stage, and digital output stage circuits of the receiver.

FIG. 7 contains a DC coupled active bandpass filter, a two quadrant voltage to logarithmic current converter, a peak detector, a tracking analog to digital converter (comparator) with current mode hysteresis and a differential to single end.

The bandpass filter is composed of transistors Q67, Q68, Q63, Q70, Q87, and Q72. In this filter, the output of the VCVS highpass filter (PKI) is connected to the gate of transistor Q67. The collector of transistor Q67 is connected to the diode-connected transistor Q63. The emitter of transistor Q63 is connected to resistor R67, which is connected to analog ground. The split collector of transistor Q63 is further connected to node PKT. Also connected to node PKT are the gate of transistor Q87 and the collector of transistor Q68. The gate of transistor Q68 is connected to node D3. The emitters of transistors Q67 and Q68 are connected to the collector of transistor Q70. The emitter of transistor Q70 is connected to resistor R62, which is connected to analog ground. The collector of transistor Q87 is connected to analog+5. The emitter of transistor Q87 is connected to node PKO. Also connected to node PKO is the collector of transistor Q72. The emitter of transistor Q72 is connected to resistor R63, which is connected to analog ground. Finally, the gates of transistors Q70 and Q72 are connected to node D6.

The bandpass voltage gain is approximately $$Av=(R70/R69)$$

The actual gain, of course, is slightly lower and determined by the complex feedback impedance determined by resistors R70 and R69, capacitors C61 and C62, and external capacitor C4d. Except for external capacitor C4d, each of these is connected to node D3. C4d is connected to resistor R69 and then is connectted to analog ground.

The lower pole is set at

Frc=½*Pi*C4d *(R69)–55 Khz,

Where R69=1.5K ohms

C64d=1800 pf

The upper pole is set at

Frc=½*Pi*CPAD*(R10)–350 Khz,

Where R70=90K ohms

CPAD=(C61+C62)=5pf

The non-inverting DC output level, PKO, tracks the static DC value of PKI, which is referenced to C1 via the VCVS highpass filter of the preceding stage. This tracking function is critical to the data detection scheme.

When the receiver is active, and static, i.e. between IR pulses, the DC value of node PKT is very close to the value of reference voltage VLOG. This is accomplished by the DC offsets in resistor R70, external resistor R2c, and the emitter current density of transistor Q87. PKT must track the value of VLOG over supply voltage and temperature changes. The tail current provided by transistor Q72 is used to establish the proper current density in transistor Q87 as well as the drive current for the feedback impedance resistor R70 and CPAD.

The two quadrant logarithmic converter is composed of transistors. Q65, Q66, Q71, Q63, Q90 and Q92. The signal voltage at the collector of transistor Q68 is converted to a logarithmic current via the bipolar logging action of the complementary pair of transistors composed of transistors Q65 and Q66. The collector of transistor Q68 is connected to the emitters of transistors Q65 and Q66. The gates of transistors Q65 and Q66 are connected to internal reference VLOG. The collector of transistor Q65 is connected to the split collector of diode-connected transistor Q64. The emitter of transistor Q64 is connected to analog +5. Further connected are the split collector of transistor Q64, the split collector of transistor Q66, and the diode-connected transistor Q71. The collector current of transistor Q65 is mirrored via transistor Q64 and summed with the collector current of transistor Q66 in the collector of transistor Q71. This summing action, in effect, acts to "rectify and sum" the bipolar signal voltage at PKT into a logarithmically proportional unidirectional current in the collector of mirror transistor Q71.

This signal dependent, pulsing current, is amplified further by the ratio of resistors R72 and R81, connected, respectively, to the emitters of transistors Q71 and Q91, and thereafter connected to analog ground. The amplified current is mirrored by transistor Q90 and drives node D7, where the emitter of transistor Q90 is connected to analog +5. The gate and split collector of transistor Q90 is connected to the collector of transistor Q91. The voltage at node D7 is determined by the instantaneous charge on external capacitor C3d.

The instantaneous charge on external capacitor C3d is the result of the relatively low discharge current provided by transistor Q92 and the relatively high pulsing current provided by transistor Q90. In this configuration, the split collector of transistor Q90 is also connected to resistor R84. Connected by node D7 are resistor R84, external capacitor C3d, and the collector of transistor Q92. The gate of transistor Q92 is connected to node D6 and the emitter of transistor Q92 is connected to resistor R83, which is, in turn, connected to analog ground.

$$E_{C3d}=1/C2d\ (iQ90-iQ92)dt$$

The voltage at D7 is used to generate the scaling current for the preamplifier and bridge amplifier.

Gain stability, transient recovery time and suppression of substrate current for the bandpass amplifier is ensured by preventing the collector voltage of transistor Q68 from ever dropping below its own base voltage. This is accomplished by diverting transistor Q68's collector current through the emitter of transistor Q65 during large negative collector transients. As noted previously, both the emitter of transistor Q65 and the collector of transistor Q68 are connected to node PKT.

Current source transistor Q62 uses split collectors to isolate the tail current mirrors used to drive the bandpass amplifier and comparator circuits. In this arrangement, the emitter of transistor Q62 is connected to resistor R73, which is connected to analog +5. The base of transistor Q62 is connected to internal reference voltage E5. The split collectors establish nodes D5 and D6, which are connected respectively to the gate and collector of transistors Q73 and Q69. Without the isolation provided by transistors Q69 and Q73, switching transients developed in the comparator and output stage will generate regenerative crosstalk via. the reference supplies and cause instability in the preceding stages. The tail current reference voltage, E5, is capacitively decoupled to ground. This helps to further isolate the internal current sources.

The peak detector is composed of transistor Q88, resistor R71, external resistor R1d, and external capacitor C1d. As exemplified in FIG. 11, the outputs of nodes PKO 601 and PKC 602 track the signal value at node PKT via transistor Q87 and Q88 respectively. Transistor Q87 is configured as a voltage follower with tail current being provided by transistor Q72, its output node, PKO 601, follows node PKT with a DC offset determined by the emitter current density of transistor Q87. Node PKC 602 can follow PKT only to the extent that external capacitor C1d is charged via resistor R71 and discharged by external resistor R1d. In this arrangement, the collector of transistor Q88 is connected to analog+5. The gate of transistor Q88 is connected to node PKT, and the emitter is connected to resistor R71. Resistor R71 is further connected to node PKC 602. Also connected to node PKC in parallel with digital ground are external capacitor C1d and external resistor R1d. The asymmetric charge and discharge results in the peak following characteristic.

By comparing the relative values of PKO and PKC, it can be shown that for a given charge/discharge rate the two signals PKO 601, PKC 602 will "cross" each other during the discharge interval 603 at a point in time 605 which is fixed relative to the the actual peak 604 of PKT. In effect, the peak of PKT has been detected independently of its absolute signal amplitude.

The differential comparator that detects the "crossing" difference of the signals at nodes PKO 601 and PKC 602 is composed of transistors Q74, Q75, and Q76. As nodes PKO and PKC cross each other, the tail current generated by transistor Q74 will switch to the transistor whose input is the most positive. In this arrangement, the collector of transistor Q74 and the emitters of transistors Q75 and Q76 are connected at node D4; the gates of transistors Q75 and Q76 are connected to nodes PKO and PKC, respectively; and the collectors of transistors Q75 and Q76 are connected to the output nodes of the comparator, D8 and D9, respectively. The emitter of transistor Q74 is connected to resistor R65, which is, in turn, connected to digital ground.

Statically, the voltage at node PKC 602 is slightly higher than at node PKO 601, this ensures that the comparator output is held high during no signal intervals. This standoff voltage is determined by the Geometry and current density differences between transistors Q87 and Q88.

The data is reconstructed by a Reset-Set (RS) current mode flip-flop composed of transistors Q77, Q78, Q79, and Q80. The collector currents of transistors Q75 and Q76 are mirrored via a single collector from transistors Q77 and Q80 respectively. Each mirrored current is ratioed by a factor of 3x, by the dual collectors of transistors Q78 and Q79 respectively, to the opposite members collector. In this arrangement, node D8 connects the collector of transistor Q75, the diode-connected transistor Q77, the collectors of transistor Q79, and the collector of transistor Q80; and node D9 connects the collector of transistor Q76, the collector of transistor Q77, the collectors of transistor Q78, the gate of transistor Q79, and the diode-connected transistor Q80. Connected to the emitters of transistors Q77, Q78, Q79, and Q80 are the resistors R75, R76, R77, and R74, respectively. Further, each of these resistors is connected to digital +5. This configuration produces an apparent voltage hysteresis at the base of transistors Q75 and Q76 by imbalancing their effective base offset voltage.

The shunt totem pole stage is composed of transistors Q82, Q81, Q84, Q83, Q85, and Q86. The gate of current sources Q82 and Q81 are connected respectively to nodes D9 and D8. While the emitters of transistors Q82 and Q81 are connected respectively to resistors R75 and R79, both of which are connected to digital +5. Current source transistors Q82 and Q81 are driven differentially by nodes D8 and D9, respectively. The split collector of transistor Q82 is connected to the diode-connected transistor Q84, as well as the gates of transistors Q85 and Q86. The emitter of transistor Q84 is connected to resistor R66. Resistor R66, and the emitters of transistors Q85 and Q86 are all connected to digital ground. Node D2 connects the collector of transistor Q81, the gate of transistor Q83, and the collector of transistor Q85. The emitter of transistor Q81 is connected to resistor R79, and both resistor R79 and the collector of transistor Q83 are connected to digital +5, the output node DFG connects the emitter of transistor Q83, the collector of transistor Q86, and external capacitor C2d. The emitters of transisters Q85 and Q86, and external capacitor C2d are all connected to digital ground. The transistor Q82 collector current is mirrored by transistor Q84 and drives transistors Q85 and Q86 in parallel. Transistor Q85 provides an active discharge of node D2 while transistor Q86 pulls the output node DFG to digital ground. This configuration starves emitter current of transistor Q83, thus allowing all of transistor Q86 collector current to discharge the output node.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for communicating from a transmitter to a receiver a sequence of bits of digital information by infrared telemetry in the presence of background radiation, comprising the steps of:

generating a packet of data consisting of a preamble and a body of a variable number of bytes of data; and transmitting for each bit of digital information in the packet, a first set of pulses representing a first binary state of the bit or a second set of pulses representing a second binary state of the bit, wherein the first set of pulses is an empty set.

2. The method of claim 1, wherein the second set of pulses comprises two pulses.

3. The method of claim 2, wherein each of the pulses is of the same duration.

4. The method of claim 3, wherein the duration of each of the pulses is approximately 5 microseconds.

5. The method of claim 3, wherein the second set of pulses consists of two pulses.

6. The method of claim 5, wherein the two pulses are supported by a time interval of approximately 5 microseconds.

7. The method of claim 6, where the time to transmit each bit is approximately 32 microseconds.

8. The method of claim 2, wherein the second set of pulses consists of two pulses.

9. The method of claim 8, wherein the duration of each of the pulses is approximately 5 microseconds.

10. The method of claim 9, wherein the two pulses are separated by a time interval of approximately 5 microseconds.

11. The method of claim 10, wherein each bit has a transmission time of approximately 32 microseconds.

12. The method of claim 8, wherein the time interval between each of the pulses representing a particular bit is equal to the duration of one of the pulses.

13. The method of claim 1, wherein the step of transmitting transmits more than 30000 bits per second.

14. The method of claim 1 wherein the step of generating further comprises:

generating a preamble comprising:
data suitable for bit-wise synchronization of the transmitter and the receiver;
data suitable for byte-wise synchronization of the transmitter and the receiver; and
data identifying the number of bytes of data in the body.

15. An apparatus for communication of a sequence of bits of digital information by infrared telemetry in the presence of background radiation, comprising:

a transmitter comprising:
  coding means, receiving the sequence of digital bits, for generating, within a preset interval for each bit in the sequence, a first set of pulses representing a first binary state of the bit or a second set of pulses representing a second binary state of the bit wherein the first set of pulses is the empty set, and
  means, coupled to the coding means, for transmitting from the transmitter pulses of infrared radiation in response to each pulse generated by the coding means;

a receiver comprising:
  means for detecting infrared radiation at the receiver to generate a first information signal, and
  filtering means, coupled to the means for detecting, for filtering the first information signal to detect sets of pulses in the first information signal; and a decoder, coupled to the receiver, for decoding detected sets of pulses to reconstitute a sequence of bits for supply to a digital data processor.

16. The apparatus of claim 15, wherein the second set of pulses consists of two pulses.

17. The apparatus of claim 15, wherein:

the receiver includes a plurality of transistors, the receiver having an active mode in which said receiver has an internal reference voltage responsive to the current density of said plurality of transistors; and the apparatus further including:
  a power supply connected to the receiver and transmitter, and
  means, coupled with the receiver, for placing the receiver into a standby mode wherein the current density of the plurality of transistors is lowered and the reference voltage is maintained.

18. The apparatus of claim 17, wherein the power supply comprises a battery.

19. The apparatus of claim 17, wherein the receiver and the transmitter operate at 31,250 bits per second.

20. The apparatus of claim 15, wherein the second set of pulses consists of two pulses of equal duration.

21. A method for communication from a transmitter to a receiver of a sequence of bits of digital information by telemetry in the presence of background radiation, comprising the steps of:

generating for each bit in the sequence a first set of pulses representing a first binary state of the bit or a second set of pulses representing a second binary state of the bit wherein the step of generating occurs within a preset interval and the first set of pulses is an empty set;

transmitting from the transmitter pulses of infrared radiation in response to each pulse generated;

detecting the pulses of infrared radiation at the receiver to generate an information signal;

filtering the information signal to detect sets of pulses in the information signal; and decoding the detected sets of pulses to reconstitute the sequence of bits wherein the step of decoding occurs at greater than 30000 bits per second.

22. The method of claim 21, wherein the second set of pulses consists of two pulses.

23. The method of claim 21, wherein transmitting the pulses of infrared radiation comprises transmitting a packet of data consisting of a preamble and a variable length body at greater than 30000 bits per second.

24. The method of claim 21, wherein the second set of pulses consists of two pulses of equal duration.

25. The method of claim 21, wherein:

each pulse in the sets of pulses in the first information signal has an amplitude and a peak: and the step of filtering comprises the step of detecting the peak of each pulse in the first information signal independently of the amplitude of the pulse.

26. An apparatus for communication of a sequence of bits of digital information by infrared telemetry in the presence of background radiation, comprising:

a transmitter comprising:
  coding means for generating for each bit in the sequence a first set of pulses within a preset interval representing a first binary state of the bit or a second set of pulses within said preset interval representing a second binary state of the bit, wherein the first set of pulses is an empty set, and
  means, coupled to the coding means, for transmitting from the transmitter, at greater than 30000 bits per second, pulses of infrared radiation in response to the set of pulses generated for each bit in the sequence;

a receiver comprising:
  means for detecting infrared radiation at the receiver to generate a first information signal, and
  filtering means, coupled to the means for detecting, for filtering the first information signal to detect sets of pulses in the first information signal at greater than 30000 bits per second;

a decoder, coupled to the receiver, for decoding detected sets of pulses to reconstitute a sequence of bits for supply to a digital data processor; and means, coupled with the receiver, for decreasing power consumption by the receiver during periods of nonuse.

27. The apparatus of claim 26, wherein the second set of pulses consists of two pulses.

28. The apparatus of claim 26, wherein the second set of pulses consists of two pulses of equal duration.

29. A method of detecting a peak of a pulse in a first information signal having pulses with peak amplitudes, comprising the steps of:

generating a second information signal following the first information signal with a DC offset, the second information signal having a first constant value between pulses;

generating a third information signal capable of following the first information signal and having a second constant value between pulses such that the second and third information signals will both be equal to a third value at a fixed point in time after the peak of the pulse in the first information signal, the third value is not equal to the first constant value or the second constant value; and comparing the second and third information signal.

30. The method of claim 29, wherein:

the second information signal is at a fourth value when the pulse in the first information signal peaks;

the third information signal is at a fifth value when the pulse in the first information signal peaks;

the fourth value being greater than the fifth value;

the second information signal and the third information signal cross at the fixed point in time after the peak of the pulse in the first information signal; and the step of comparing detects the crossing of the second information signal and the third information signal.

31. A method of communicating a sequence of bits of digital information from a transmitter to a receiver by infrared telemetry, wherein each bit in the sequence is in either a first state or a second state, comprising the steps of:

determining the state of each bit in the sequence;

establishing a window of time for the state of each bit to be communicated from the transmitter to the receiver;

generating for each bit to be communicated no pulses of infrared radiation at the transmitter during the window of time if the bit is in the first state and two pulses of infrared radiation at the transmitter during the window of time if the bit is in the second state, said two pulses generated such that the peaks of the pulses define a preset interval of time; and detecting, at the receiver, whether two pulses with peaks defining a preset interval of time have been generated during the window of time.

32. The method of claim 31, wherein the window of time is 32 microseconds.

* * * * *